United States Patent [19]

Foster et al.

[11] Patent Number: 4,509,935

[45] Date of Patent: Apr. 9, 1985

[54] BELT TENSIONER AND METHOD OF MAKING THE SAME

[75] Inventors: Randy C. Foster, Springfield; Roger G. Hackard, Sparta; Leslie B. Wilson, Reeds Spring, all of Mo.

[73] Assignee: Dayco Corporation, Dayton, Ohio

[21] Appl. No.: 296,697

[22] Filed: Aug. 27, 1981

[51] Int. Cl.³ .................... F16H 7/12; F16D 57/00; F16F 9/14; F16F 9/48

[52] U.S. Cl. .................... 474/138; 188/290; 188/306; 188/316; 188/285; 474/136

[58] Field of Search ........... 474/110, 111, 109, 104, 474/103, 131, 138, 132, 133, 134, 135, 136, 137, 148; 464/180; 188/285, 302, 290, 306, 316

[56] References Cited

U.S. PATENT DOCUMENTS

| 333,831 | 1/1886 | Corliss | 188/316 |
|---|---|---|---|
| 1,134,224 | 4/1915 | Phillips | 188/302 |
| 1,240,196 | 9/1917 | Gouldbourn | 188/316 |
| 1,260,405 | 3/1918 | Krussell | 188/316 |
| 1,304,585 | 5/1919 | McFarland | 188/285 |
| 1,519,451 | 12/1924 | Harris | 188/302 |
| 2,554,969 | 5/1951 | Williams | 474/109 |
| 2,936,860 | 5/1960 | Peras | 188/298 |
| 3,101,005 | 8/1963 | Mittag | 474/104 |
| 3,142,193 | 7/1964 | Polko et al. | 474/110 |
| 3,574,418 | 4/1971 | Okabe | 474/110 |
| 3,645,586 | 2/1972 | Piepho | 474/110 |
| 3,802,286 | 4/1974 | Winklhofer et al. | 474/111 |
| 4,276,038 | 6/1981 | Kraft | 474/110 |

FOREIGN PATENT DOCUMENTS

| 48777 | 4/1977 | Japan | 188/285 |
|---|---|---|---|
| 120375 | 9/1979 | Japan | 188/285 |
| 299670 | 11/1928 | United Kingdom | 188/316 |
| 615549 | 1/1949 | United Kingdom | 188/88.51 |
| 2065265 | 6/1981 | United Kingdom | 474/111 |
| 120975 | 10/1959 | U.S.S.R. | 474/110 |
| 481691 | 8/1975 | U.S.S.R. | 267/162 |
| 848813 | 7/1981 | U.S.S.R. | 474/137 |

OTHER PUBLICATIONS

Patent application Ser. No. 296,694, filed 8/27/81, (Dayco Corporation Docket No. 81-6), of Leslie B. Wilson.

Primary Examiner—Lawrence J. Staab
Assistant Examiner—Michael D. Bednarek
Attorney, Agent, or Firm—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with a force to tension the belt, and a fluid dampening unit operatively associated with the support unit and the belt engaging unit to dampen the movement of the belt engaging unit relative to the support unit in at least one direction of movement thereof, the dampening unit comprising a piston unit and a cylinder unit having the piston unit therein and defining two chambers for fluid in the cylinder unit on opposite sides of the piston unit. An accumulator chamber is disposed remote from the two chambers and a passage arrangement leads from one of the two chambers of the cylinder unit to the accumulator chamber.

3 Claims, 6 Drawing Figures

BELT TENSIONER AND METHOD OF MAKING THE SAME

BACKGROUND OF THE INVENTION

1. Field of the Invention

This invention relates to a tensioner for an endless power transmission belt or the like as well as to a method for making such a tensioner.

2. Prior Art Statement

It is known to applicants to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with support means and the belt engaging means for urging the belt engaging means relative to the support means and against the belt with a force to tension the belt, and fluid dampening means operatively associated with the support means and the belt engaging means to dampen the movement of the belt engaging means relative to the support means, the dampening means comprising a piston means and cylinder means having the piston means and a fluid therein. The piston means defining two chambers for the fluid in the cylinder means on opposite sides of the piston means and having a piston rod interconnected to one of the opposed sides thereof and extending through one of the two chambers, the piston means and cylinder means having means that fluidly interconnects the two chambers together in a restrictive manner to provide a dampening effect upon relative movement between the piston means and the cylinder means upon the movement of the belt engaging means relative to the support means.

For example, see the co-pending patent application Ser. No. 296,694, filed Aug. 27, 1981 of Leslie B. Wilson, one of the applicants of this application.

It is also known in the art to provide a piston and cylinder arrangement for hydraulically urging an idler pulley in tensioning engagement against a belt.

For example, see the following two United States Patents:

(2) U.S. Pat. No. 3,142,193—Polko et al
(3) U.S. Pat. No. 4,276,038—Kraft

SUMMARY OF THE INVENTION

It is one feature of this invention to provide an improved tensioner for a power transmission belt or the like.

In particular, it was found according to the teachings of this invention that when a piston and cylinder unit is being utilized to provide fluid dampening of a belt tensioner wherein relative movement is caused between the piston means and cylinder means of the dampening unit, some means must be utilized to compensate for the volume changes created by the piston rod of the piston means in the fluid chamber that has the piston rod disposed therein.

It was further found according to the teachings of this invention that the means of this invention to compensate for the volume changes caused by the piston rod of the fluid dampened belt tensioner could be utilized to provide a means to dampen the movement of the belt engaging means of the belt tensioner with a greater restricting force when the belt engaging means is being moved in one direction relative to the support means of the belt tensioner than the restricting force provided by the dampening means when the belt engaging means is being moved in the opposite direction relative to the support means.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and fluid dampening means operatively associated with the support means and the belt engaging means to dampen the movement of the belt engaging means relative to the support means, the dampening means comprising a piston means and a cylinder means having the piston and a fluid. The piston means defines two chambers for the fluid in the cylinder means on opposite sides of the piston means and having a piston rod interconnected to one of the opposed sides thereof and extending through one of the two chambers, the piston means and cylinder means having means that fluidly interconnects the two chambers together in a restrictive manner to provide a dampening effect upon relative movement between the piston means and the cylinder means upon the movement of the belt engaging means relative to the support means. An accumulator chamber is disposed remote from the the two chambers. The piston rod is the only piston rod carried by the piston means and does not extend through the other of the two chambers. A passage defining means leads from one of the two chambers so that the accumulator chamber can compensate for the volume changes created in the one chamber by the piston rod that are different from the volume changes created in the other chamber during the relative movement between the piston means and the cylinder means of the cylinder means to the accumulator chamber. The passage defining means has a fluid flow restricting first passage means that interconnects the one of the two chambers to the accumulator chamber and a fluid flow non-restricting second passage means that interconnects the one of the two chambers to the accumulator chamber. A one-way check valve means is disposed in the second passage means and closes the second passage means only when the belt engaging means is being moved in one direction relative to the support means whereby the dampening means dampens the movement of the belt engaging means with a greater restricting force when the belt engaging means is being moved in the one direction relative to the support means than the restricting force of the dampening means when the belt engaging means is being moved in the opposite direction relative to the support means.

Accordingly, it is an object of this invention to provide an improved tensioner for a power transmission belt or the like, the tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Other objects uses and advantages of this invention are apparent from a reading of this description which proceeds with reference to the accompanying drawings forming a part thereof and wherein:

DESCRIPTION OF THE PREFERRED EMBODIMENT

Figure 1:
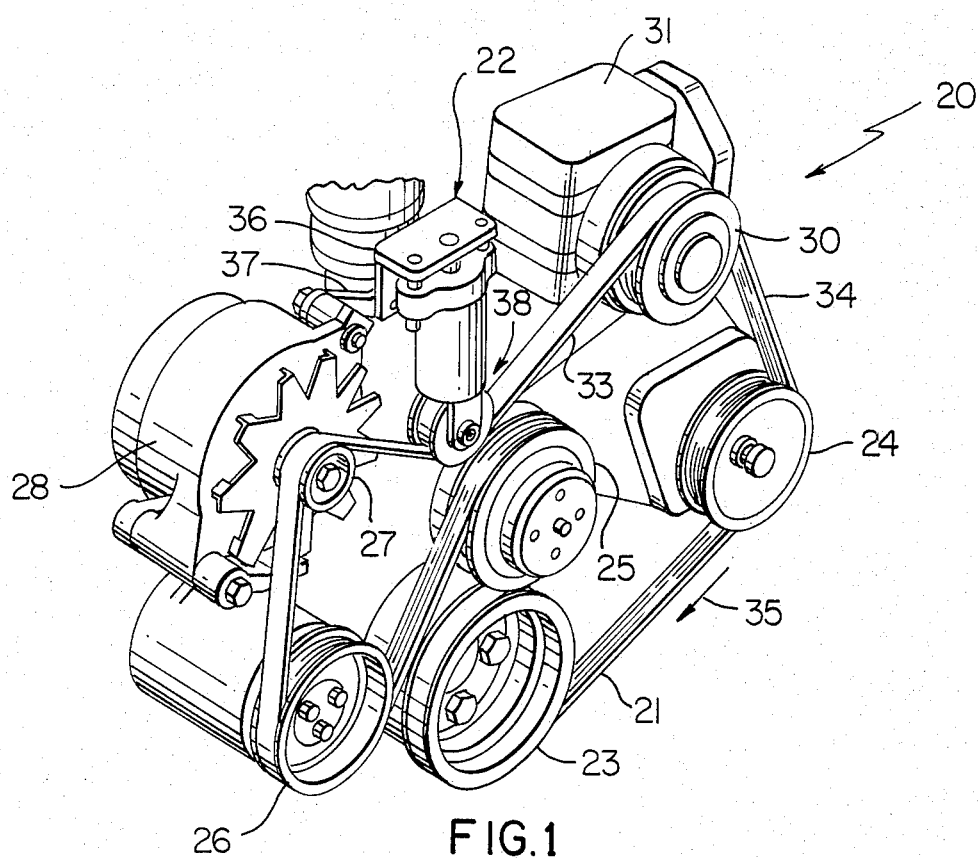
FIG. 1 is a fragmentary isometric view looking toward the front end of an automobile engine which utilizes one embodiment of the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiment illustrated in the drawings, because the drawings are merely utilized to illustrate one of the wide varieties of uses of this invention.

Figure 2:
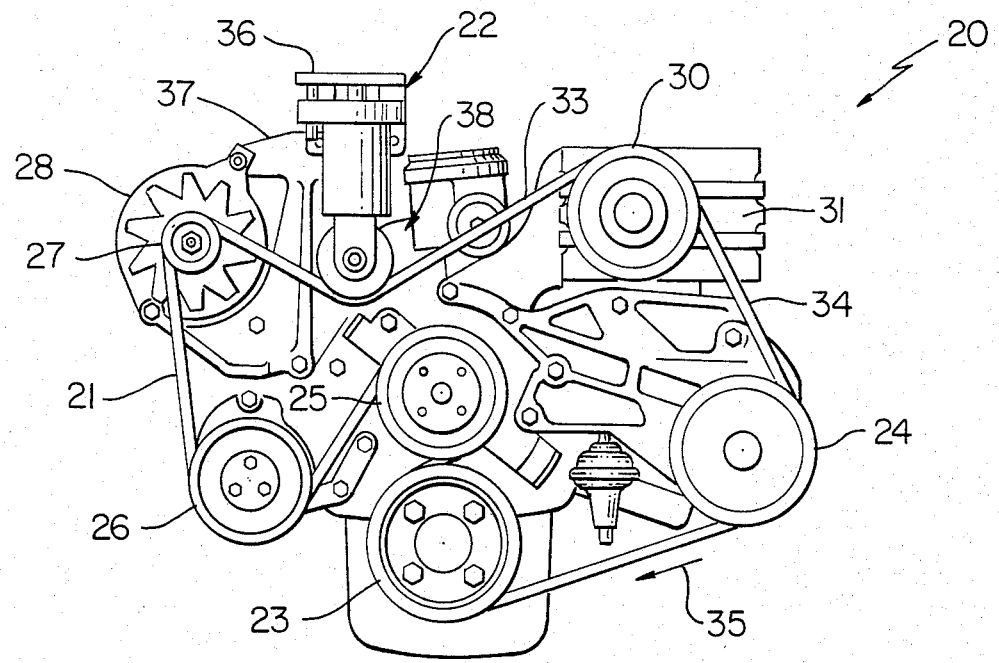
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permits the tensioner 21 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 3:
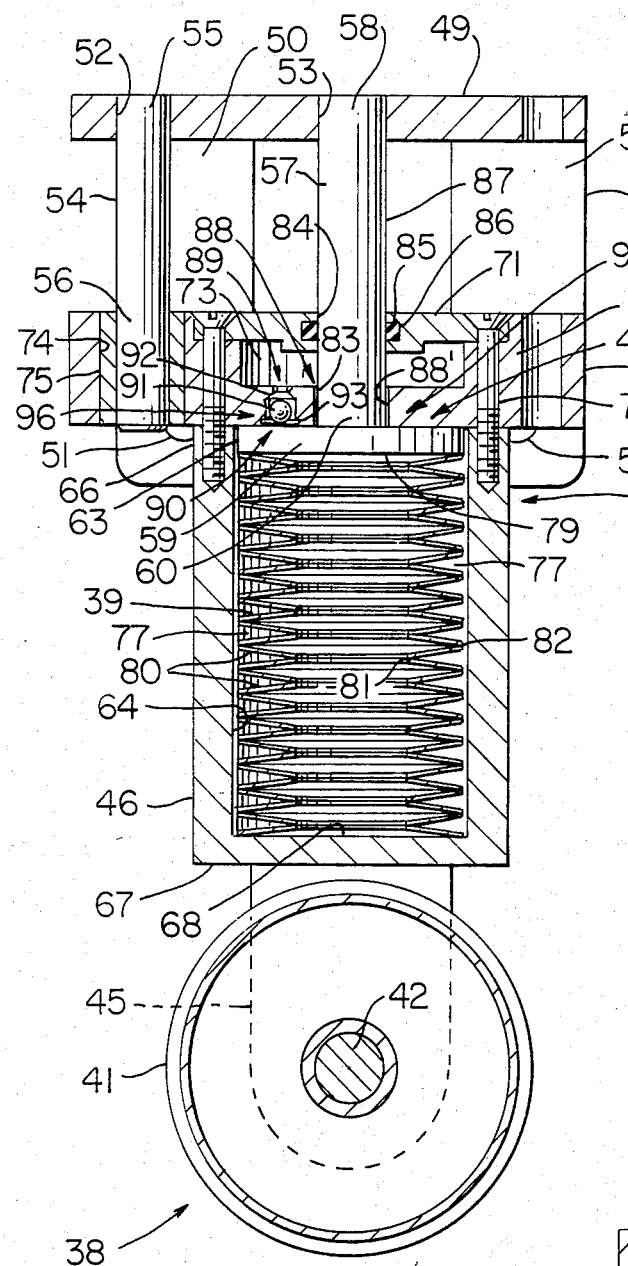
FIG. 3 is an enlarged front view, partially in cross section, of the belt tensioner of this invention that is being utilized for tensioning the power transmission belt of FIGS. 1 and 2.
Figure 6:
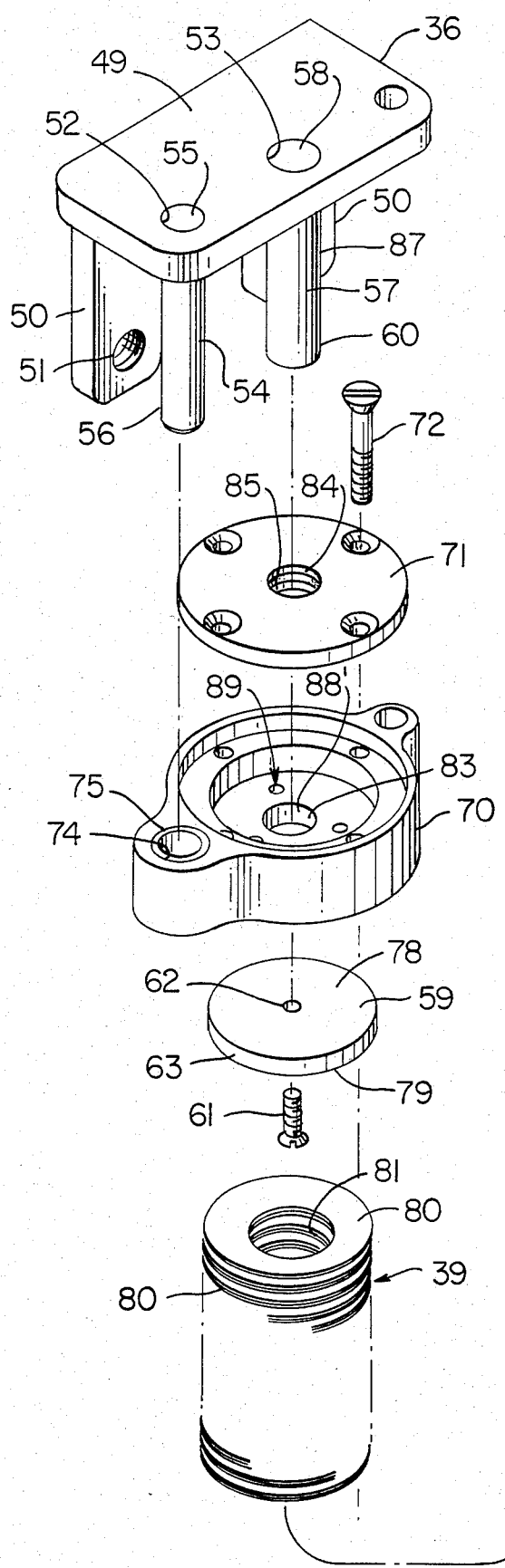
FIG. 6 is an exploded perspective view of the various parts of the belt tensioner of this invention.
Figure 6:
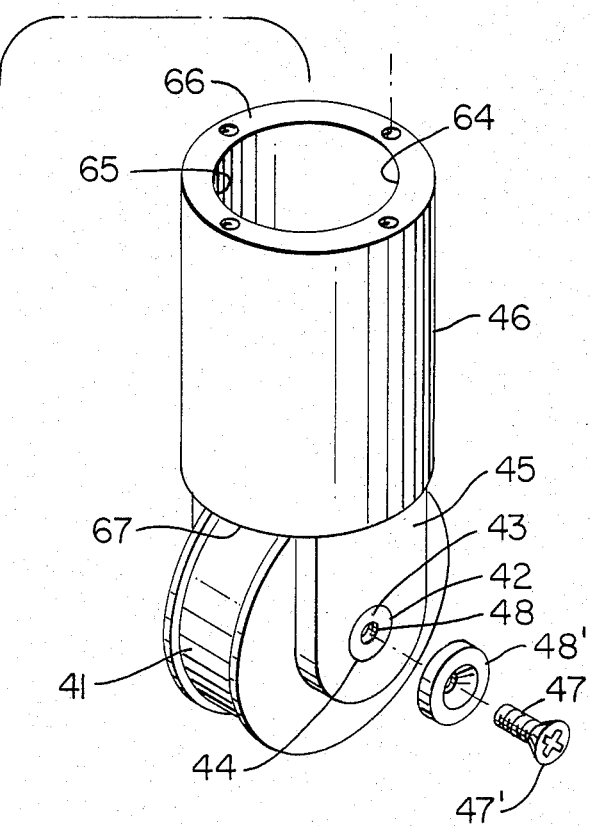

As best illustrated in FIGS. 3 and 6, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 in a manner hereinafter set forth.

The belt engaging means 38 comprises an idler pulley 41 rotatably mounted on an axle 42 having its opposed ends 43 received in openings 44 in a pair of spaced apart and depending flanges 45 of a cylinder member 46, the ends 43 of the axle 42 being secured to the respective flanges 45 by threaded fastening members 47 being threadedly received in internally threaded openings 48 in the ends 43 of the axle 42. Suitable washers 48' that are larger in diameter than the openings 44, are utilized with the threaded fastening members 47 to be sandwiched between the flanges 45 and the enlarged heads 47' of the fastening members 47 and thereby secure the idler pulley 41 for rotational movement within the yoke arrangement provided by the depending flanges 45 and the cylinder member 46.

The support means 36 includes a top plate 49 having a pair of back plates 50 respectively secured thereto in any suitable manner, such as by being welded thereto or being integral and one-piece therewith as desired. In any event, the back plates 50 respectively have mounting openings 51 therein for securing the support means 36 to the bracket 37 of the engine 20 so that the support means 36 will be fixed relative to the belt 21 which is to be engaged by the idler pulley 41 in a manner well known in the art.

The top plate 49 of the support means 36 has a pair of openings 52 and 53 formed therethrough. A guide rod 54 has one end 55 thereof secured in the opening 52, such as by welding or the like, whereby the lower end 56 of the guide rod 54 is utilized for guiding movement of the belt engaging means 38 relative to the support means 36 in a manner hereinafter set forth.

A piston rod 57 has one end 58 thereof secured in the opening 53 of the support plate 49, such as by welding or the like, and has a piston member or disc 59 secured to the lower end 60 thereof by a threaded fastening member 61 passing through an opening 62 in the piston member 59 and being received in a threaded opening (not shown) in the end 60 of the rod 57 whereby the piston member 59 is secured to the piston rod 57 which, in turn, is secured to the support means 36 so as to be non-movable relative thereto.

The piston member 59 is substantially circular in cross-sectional configuration and has a cylindrical external peripheral surface 63 adapted to be disposed closely adjacent the internal peripheral surface 64 of a cylindrical opening 65 formed through the cylinder member 46 from its upper end 66 thereof to closely adjacent the lower end 67 thereof to define an internal bottom wall 68 in the cylinder member 46.

A wall means 69 formed of two housing member 70 and 71 secured together by threaded fastening members 72 is likewise secured to the end 66 of the cylinder member 46 by the fastening members 72 so as to close the upper end 66 thereof and be movable in unison with the cylinder member 46, the housing members 70 and 71 cooperating together to define an accumulator chamber 73 therebetween for a purpose hereinafter described.

An opening 74 passes through the housing member 70 of the wall means 69 and has a sleeve bearing 75 secured therein and telescopically receiving the lower end 56 of the guide rod 54 whereby movement of the wall means 69 relative to the support means 36 is guided by the guide rod 54 and, thus, movement of the belt engaging means 38 relative to the support means 36 is guided by the guide rod 54.

The piston member 59 cooperates with the cylinder member 46 to define a pair of chambers 76 and 77 on opposite sides 78 and 79 of the piston member 59 which are fluidly interconnected together by the restrictive spacing between the external peripheral surface 63 of the piston member 59 and the internal peripheral surface 64 of the cylinder member 46 so as to provide a dampening effect in the relative movement between the cylinder member 46 and the piston member 59 as will be apparent hereinafter.

The spring means 39 comprise a plurality of spring discs or washers 80 disposed in the stacked relation illustrated in FIG. 3 between the bottom wall 68 and the side 79 of the piston member 59 and, thus, are contained in the chamber 77 of the cylinder member 46 to provide the urging force on the belt engaging means 38 against the belt 21 in a manner hereinafter set forth.

The spring discs or washers 80 are of the type commonly sold and known as "belleville spring washers" and can be so selected and arranged that the same will provide a substantially constant urging force or even an increasing urging force as the idler pulley 41 is being moved toward the belt 21 to take up further slack therein under the spring force of the spring washers 80 in a manner fully set forth and claimed in the aforementioned co-pending patent application, Ser. No. 296,694, filed Aug. 27, 1981 whereby such co-pending patent application is being incorporated into this disclosure by this reference thereto not only for a further description of the structure and operation of the spring washers 80, but also for a further description of the reasons for and the operation of the fluid dampening means 40 whereby a further discussion of the spring means 39 in this application is deemed unnecessary except to state that the spring washers 80 when compressed between their inner peripheries 81 and outer peripheries 82 deflect in such a manner that the same store spring energy to tend to expand the same and thereby urge the pulley 41 away from the support means 36 toward the belt 21 as will be apparent hereinafter.

Of course, it is to be understood that other types of mechanical spring means could be utilized in the tensioner 22 of this invention, if desired, whereby this invention is not to be limited to the particular spring washers 80 illustrated and described.

The wall means 69 has aligned openings 83 and 84 respectively formed through the housing parts 70 and 71 so as to receive the piston rod 57 therethrough, the opening 54 in the housing member 71 being sealed by a flexible O-ring like annular sealing member 85 being received in an annular groove 86 in the housing member 71 and being in compressed relation against the external peripheral surface 87 of the piston rod 67 so as to prevent fluid communication from the accumulator chamber 73 through the opening 84 in the housing member 71 even though relative movement is provided between the housing member 71 and the piston rod 57 as hereinafter set forth.

In contrast, the opening 83 in the housing member 70 defines an internal peripheral surface 88' of the wall means 69 which cooperates with the external peripheral surface 87 of the piston rod 57 to define a restrictive flow passage between the chamber 76 of the cylinder member 46 and the accumulator chamber 73 for a purpose hereinafter described, the restrictive passage between the internal peripheral surface 88' of the wall means 69 and the external peripheral surface 87 of the piston rod 57 being generally indicated by the reference numeral 88 in the drawings.

A plurality of other passage means, generally indicated by the reference numeral 89, are formed through the housing member 70 of the wall means 69 to fluidly interconnect the accumulator chamber 73 to the chamber 76 of the cylinder member 46 except that each passage 89 has a one-way check valve means disposed therein that is generally indicated by the reference numeral 90 in the drawings.

Figure 4:
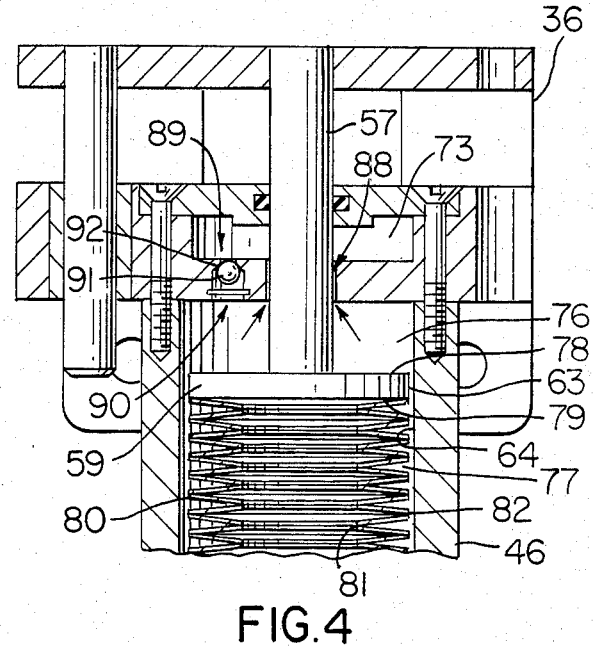
FIG. 4 is a fragmentary view similar to FIG. 3 and illustrating the belt tensioner of this invention in one condition of operation thereof.
Figure 5:
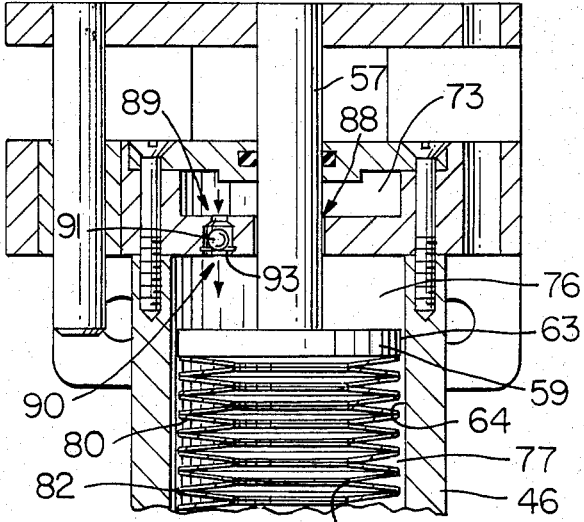
FIG. 5 is a view similar to FIG. 4 and illustrates the belt tensioner of this invention in another condition of operation thereof.

While any suitable one-way check valve means 90 can be utilized, the one-way check valve means 90 illustrated in the drawings each comprises a ball check valve member 91 movable in its respective passage 89 and adapted to move against a valve seat 92 to close the respective passage 89 when a fluid force is being created in the chamber 76 that is larger than the fluid force in the accumulator chamber 73 in a manner hereinafter described and as illustrated in FIG. 4. However, each ball 91 is adapted to move against a flow open retainer 93 and thus, away from the seat 92 when there is no pressure differential being created across the ball valve member 91 as illustrated in FIGS. 3 and 5 so as to provide unrestricted fluid flow from the accumulator chamber 73 to the chamber 76 as will be apparent hereinafter.

While three passages 89 and their respective one-way check valve means 90 are illustrated in the drawings, it is to be understood that one or any desired numer of unrestricted flow passages 89 with one-way check valve means 90 therein can be provided as desired.

With the tensioner 22 in the condition illustrated in FIG. 3 wherein the spring means 39 has urged the cylinder member 46 away from the support means 36 to the maximum permissible distance because the wall means 69 is disposed against the side 78 of the stationary piston 59 so that further movement of the cylinder member 46 relative to the support means 36 cannot take place, the chamber 77 has been substantially filled with any suitable dampening liquid, such as a hydraulic oil or the like, while the accumulator chamber 73 is merely at atmosphere condition and does not contain any appreciable amount of the dampening liquid therein so that the accumulator chamber 73 can receive the amount of liquid from the chamber 76 of the cylinder member 46 that will be displaced by the volume of the piston rod 57 that is, in effect, being disposed in the chamber 76 as the cylinder member 46 moves upwardly in the drawings as illustrated in FIG. 4 toward the support means 36 the maximum amount permitted when the wall means 69 engages against the top plate 49 of the support means 36, such filling of the accumulator chamber 73 with the displaced liquid from the chamber 76 by the piston rod 57 being utilized to restrict such movement of the cylinder member 46 in a direction away from the belt 21 at a greater rate than the rate of dampening movement of the cylinder 46 towards the belt 21 under the force of the spring means 39 as will be apparent hereinafter.

Therefore, it can be seen that the piston member 59 and piston rod 57 comprise a piston means of the dampening means 40 that is generally indicated by the reference numeral 94 in the drawings while the cylinder member 46 and wall means 69 cooperate together to define a cylinder means of the dampening means 40 that is generally indicated by the reference numeral 95.

Thus, it can be seen that the piston means 94 of the fluid dampening means 40 is operatively interconnected to the support means 36 and the cylinder means 95 of the fluid dampening means 40 is operatively interconnected to the belt engaging means 38.

However, it is to be understood that the tensioner 22 could be arranged in a manner that the piston means 64 is operatively interconnected to the belt engaging means 38 while the cylinder means 95 is operatively interconnected to the support means 36, if desired.

It can also be seen that the wall means 69 of the cylinder means 95 is a passage defining means that is generally indicated by the reference numeral 96 in the drawings that fluidly interconnects the chamber 76 of the cylinder means 95 to the accumulator chamber 73 that is disposed remote from the chamber 76, the passage defining means 96 including a fluid flow restricting first passage means 88 and a fluid flow non-restricting second passage means 89 having one-way check valve means 90 therein.

Therefore, it can be seen that it is a relatively simple method of this invention to form the belt tensioner 22 of this invention to operate in a manner now to be described.

When the tensioner 22 of this invention is initially mounted to the bracket 37 of the engine 20, the idler pulley 41 in its engagement against the stationary belt 21 has moved the cylinder means 46 in a direction toward the plate 49 of the fixed support means 36 the maximum amount desired so that the spring washers 80 are in their most compressed or deflected condition, such movement of the cylinder means 46 toward the plate 49 of the support means 36 causing the fluid in the chamber 77 to flow around the piston member 59 because of the decreasing volume of the chamber 77 into the increasing volume of chamber 76 but because of the increasing length of the piston rod 57 now being provided in the chamber 76, the fluid in chamber 76 is, in effect, under pressure and closes the ball valves 91 against the valve seats 92 so that the piston rod displaced fluid is forced into the accumulator chamber 73 through the restrictive passage 88.

Nevertheless, once the initial position of the tensioner 22 has been established so that the spring means 39 is under the desired amount of compression, the force of the spring means 39 tends to urge the belt engaging means 38 in its tensioning direction against the belt 21 with a force determined by the initial deflection of the spring washers 80 in the at rest position of the engine 20.

Thereafter, each time the engine 20 is initially started so as to cause slack in the slack side 33 of the belt 21 and a tightening in the tight side 34 thereof, the force of the spring means 39 causes the idler pulley 41 to move inwardly to take up the slack of the belt 21 on the slack side 33 thereof and provide a tensioning force thereon as determined by the force of the spring washers 80, such inward movement of the pulley 41 causing the cylinder member 46 to move downwardly as illustrated in FIG. 5 and displace part of the fluid in chamber 76 to chamber 77 around the piston member 59 in a manner to dampen such downward movement of the idler pulley 41 as determined by the amount of clearance desired between the outer periphery 63 of the piston member 59 and the internal peripheral surface 64 of the cylinder member 46.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the idler pulley 41 of the tensioner 22.

In those instances where the deflection of the portion 33 of the belt 21 is upwardly in FIGS. 1 and 2 to tend to cause the pulley 41 to move upwardly relative to the support means 36, such movement causes the cylinder member 46 to move upwardly and thereby not only force part of the fluid from the chamber 77 around the piston member 59 into the chamber 76 to restrict such upward movement of the cylinder 46 with a dampening force determined by the restriction of the clearance between the piston member 59 and cylinder member 46, but also since a portion of the piston rod 57 is being added to the chamber 76, the amount of the volume of the piston rod 57 being added to the chamber 76 causes a like volume of the liquid in the chamber 76 to, in effect, become under pressure and thereby close the ball valves 91 of the passages 89 and be forced through the restrictive passage 88 to the accumulator 73 in a manner to further retard movement of the cylinder member 46 toward the support plate 48, the air in the accumulator chamber 73 being compressed by the liquid being forced therein. Thus, such upward movement of the idler pulley 41 relative to the support means 36 is at a slower rate than when the idler pulley 41 is being moved downwardly away from the support means 36 because in such downward movement, the non-restricting passages 89 are open to permit a free flow of liquid from the accumulator chamber 73 back to the chamber 76 for the reasons hereinafter set forth.

In this manner, it is believed that the dampening means 40 of this invention will prolong the life of the tensioner 22 so that rapid oscillations of the spring means 39 thereof cannot take place and the spring means 39 will perform its tensioning function in a relatively smooth manner.

In particular, since the restrictive passage means 88 in combination with the non-restrictive passage means 89 provides a preferential flow ratio that can be built into the tensioner 22, the tensioner 22 will deliver increased tension on the belt 21 when the belt 21 is subjected to acceleration and/or heavy cyclic loads commonly encountered in belt drive systems. Accordingly, if the fluid flow from the chamber 76 to the accumulator 73 is more restrictive than reverse flow, load fluctuations in the belt system will result in the idler pulley 41 being moved down into the belt 21 more rapidly than movement of the idler pulley 41 upwardly relative to the belt 21. In this manner, the tensioner 22 will deliver greater tension when the system demands and less tension when less tension is required. This can result in increased bearing life in belt drive accessories, reduced belt slippage under heavy loading conditions, and an increased effective life of the tensioner 22 itself.

Obviously, when the idler pulley 41 moves toward the belt 21 after a previous upward movement of the cylinder member 46 relative to the support means 36 to force liquid into the accumulator 73 in the manner previously described, the liquid in the accumulator chamber 73 can return to the chamber 76 through the non-restrictive passages 89 by gravity and under the force of the air compressed in the accumulator chamber 73 as well as by the suction being created by the resulting loss of the volume of the piston rod 57 being subtracted from the combined volumes of the chambers 76 and 77. Thus, the liquid returning from the accumulator chamber 73 into the chamber 76 does not retard downward movement of the cylinder member 46 as illustrated in FIG. 5 and readily replaces the increasing volume of the combined chambers 76 and 77 with results by less volume of the piston rod 57 being disposed in the chamber 76.

Therefore, it can be seen that this invention not only provides an improved belt tensioner, but also this invention provides an improved method of making such a belt tensioner.

It is to be understood that while the tensioner 22 of this invention has been described as operating with a liquid disposed in the dampening means 40 thereof, the dampening means 40 could utilize air or other suitable gases as desired because the tensioner 22 would operate in a similar manner whereby the dampening means 40 is described and claimed as a fluid dampening means.

While the form and method of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and fluid dampening means operatively associated with said support means and said belt engaging means to dampen the movement of said belt engaging means relative to said support means, said dampening means comprising a piston means and a cylinder means having said piston means and a fluid therein, said piston means defining two chambers for said fluid in said cylinder means on opposite sides of said piston means and having a piston rod interconnected to one of said opposed sides thereof and extending through one of said two chambers, said piston means and cylinder means having means that fluidly interconnects said two chambers together in a restrictive manner to provide a dampening effect upon relative movement between said piston means and said cylinder means upon said movement of said belt engaging means relative to said support means, the improvement comprising means defining an accumulator chamber remote from said two chambers, said piston rod being the only piston rod carried by said piston means and not extending through the other of said two chambers, passage defining means leading from said one of said two chambers of said cylinder means to said accumulator chamber so that said accumulator chamber can compensate for the volume changes created in said one chamber by said piston rod that are different from the volume changes created in said other chamber during said relative movement between said piston means and said cylinder means, said passage defining means having a fluid flow restricting first passage means that interconnects said one of said two chambers to said accumulator chamber and a fluid flow non-restricting second passage means that interconnects said one of said two chambers to said accumulator chamber, and one-way check valve means in said second passage means that closes said second passage means only when said belt engaging means is being moved in one direction relative to said support means whereby said dampening means dampens the movement of said belt engaging means with a greater restricting force when said belt engaging means is being moved in said one direction relative to said support means than the restricting force of said dampening means when said belt engaging means is being moved in the opposite direction relative to said support means.

2. A tensioner as set forth in claim 1 wherein said cylinder means has a wall means separating said one of said two chambers from said accumulator chamber, said wall means having an opening therethrough telescopically receiving said piston rod, said opening defining an internal peripheral surface means of said wall means that cooperates with said piston rod to define said fluid flow restricting first passage means that interconnects said one of said two chambers to said accumulator chamber.

3. A tensioner as set forth in claim 2 wherein said wall means has at least one other opening therethrough that defines said second passage means that interconnects said one of said two chambers to said accumulator chamber.

* * * * *